March 24, 1959
A. M. BRENNEKE
2,878,799
VALVE STEM SEAL
Filed June 28, 1955
2 Sheets-Sheet 1
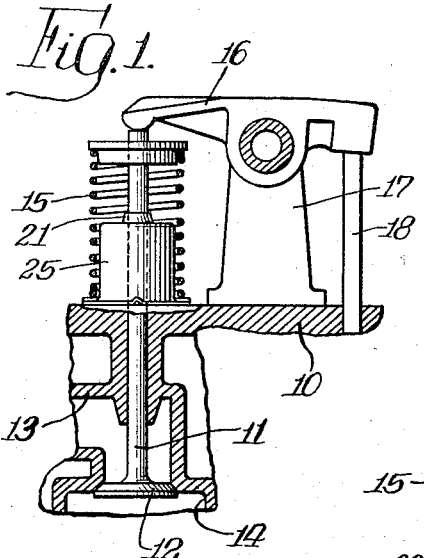
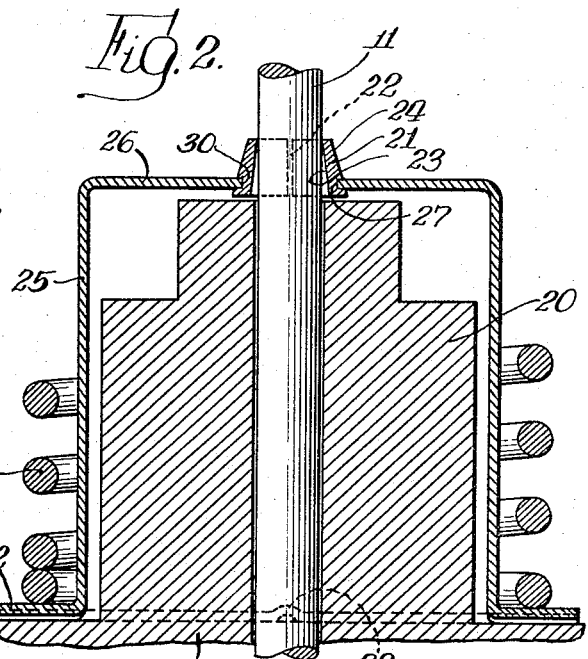
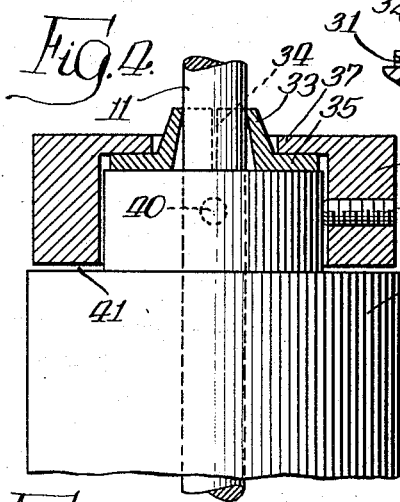
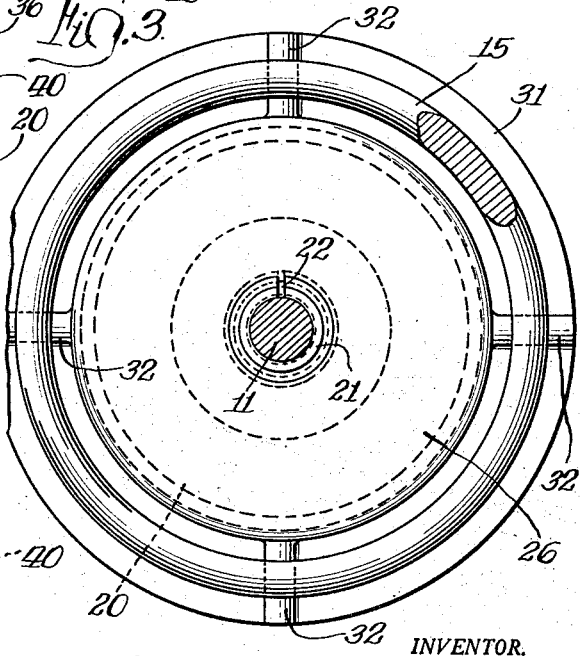
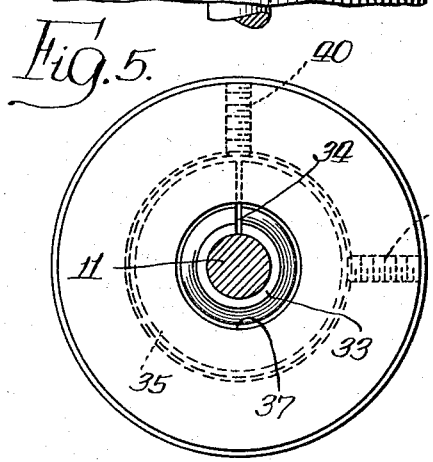
INVENTOR.
Arthur M. Brenneke,
BY
Davis, Lindsey, Hibben & Noyes
Attys.

March 24, 1959     A. M. BRENNEKE     2,878,799
VALVE STEM SEAL
Filed June 28, 1955     2 Sheets-Sheet 2
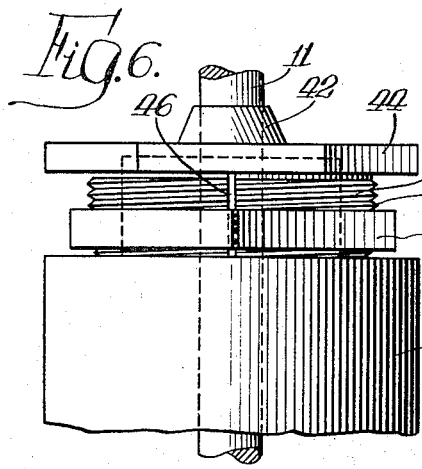
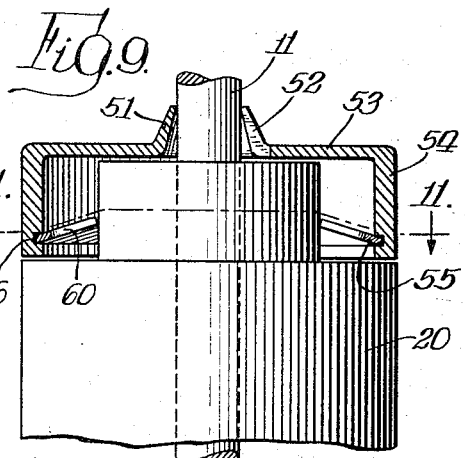
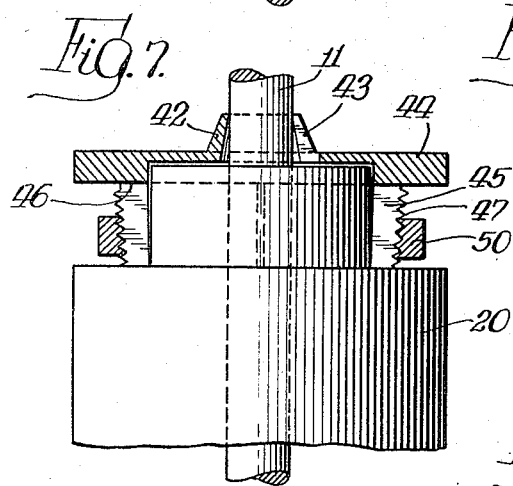
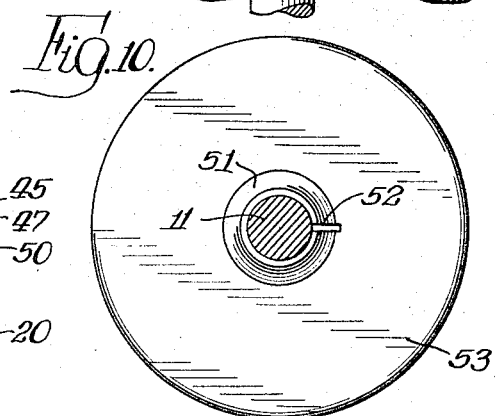
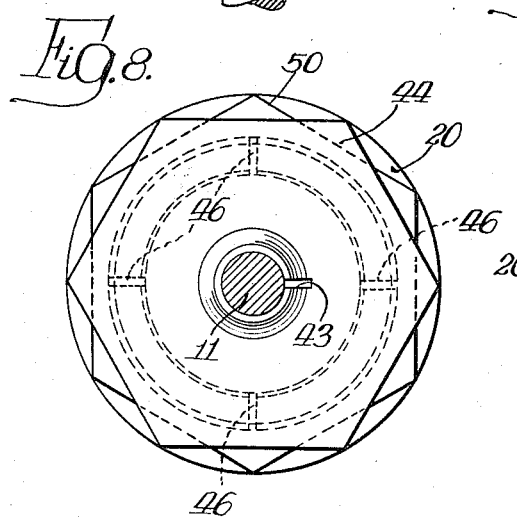
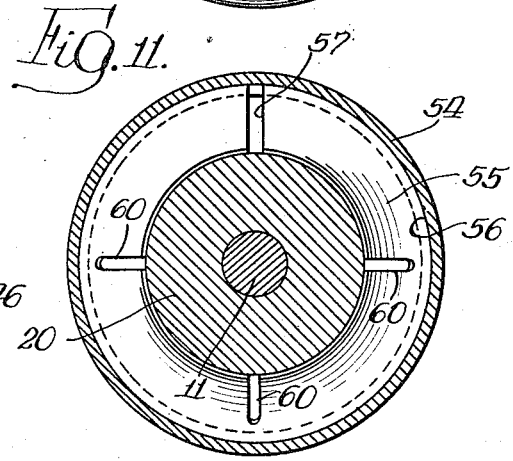
INVENTOR.
Arthur M. Brenneke,

United States Patent Office 2,878,799
Patented Mar. 24, 1959

2,878,799

VALVE STEM SEAL

Arthur M. Brenneke, Hagerstown, Ind., assignor to Perfect Circle Corporation, Hagerstown, Ind., a corporation of Indiana Application June 28, 1955, Serial No. 518,429

11 Claims. (Cl. 123—188)

The invention relates generally to valve means for internal combustion engines and more particularly to a seal for the stem of the valve.

The general object of the invention is to provide a novel seal for use on the stem of a valve to prevent excess oil from running along the stem toward the head of the valve.

Another object is to provide a novel seal for a valve stem, which is made of metal and which resiliently hugs the valve stem to scrape off excess oil but permits enough oil to remain on the stem to provide for proper lubrication of the guide in which the stem reciprocates.

A further object is to provide a seal for use on the stem of a valve, and novel means for securing the seal in place adjacent the guide in the cylinder head.

Still another object is to provide a novel valve stem seal and securing means therefor, which gives added support for the valve stem and thus reduces the tendency of the guide to wear.

A still further object is to provide a seal for a valve stem, and novel means for securing the seal in place adjacent the valve stem guide, the securing means being so constructed that the seal is held concentric with the stem even though the outside surface of the valve stem guide is eccentric with respect to the stem.

Other objects and advantages will become apparent from the following description taken in connection with the accompanying drawings, in which:

Fig. 1 is a fragmentary view of the valve operating mechanism and valve of an internal combustion engine and provided with a valve stem seal embodying the features of the invention;

Fig. 2 is an enlarged longitudinal sectional view showing a fragmentary portion of the cylinder head and valve stem, and the valve stem seal and attaching means shown in Fig. 1;

Fig. 3 is a plan view of the valve stem seal and attaching means shown in Fig. 2;

Fig. 4 is a view similar to Fig. 2 but showing a modified form of valve stem seal and attaching means;

Fig. 5 is a plan view of the valve stem seal and attaching means shown in Fig. 4;

Fig. 6 is a side elevational view of another modified form of valve stem seal and attaching means;

Fig. 7 is a view similar to Fig. 2 but showing the valve stem seal and attaching means illustrated in Fig. 6;

Fig. 8 is a plan view of the valve stem seal and attaching means shown in Figs. 6 and 7;

Fig. 9 is a view similar to Fig. 2 but showing still another modified form of valve stem seal and attaching means;

Fig. 10 is a plan view of the valve stem seal and attaching means shown in Fig. 9; and Fig. 11 is a horizontal sectional view taken on the line 11—11 of Fig. 9.

In the ordinary internal combustion engine of the type used for automotive purposes, the stem of each valve is mounted in a valve guide which may be formed as a part of the cylinder head or as a separate guide press-fitted into the head. A rocker arm operated from the cam shaft of the engine bears against the end of the valve stem opposite to the valve head to open and close the valve. Because of the metal-to-metal contact of the rocker arm and the valve stem, oil is supplied to the point of contact through the rocker arm.

In many engines, the flow of oil from this source is so excessive that some of it flows along the stem of the valve to the valve head and is drawn into the combustion chamber, in the case of intake valves, or mixes with the exhaust gas, in the case of exhaust valves. In a new engine, the flow of oil in this manner is limited to some extent by the fit of the valve guide around the stem, but as the valve guide and stem wear, the tendency for excess flow increases. In the case of engines with overhead valves, gravity tends to increase the flow in this manner. In the case of L-head engines, excess oil from this source may form a mist around the valve and may be drawn into the combustion chamber in the case of intake valves, or may be mixed with the exhaust gas in the case of exhaust valves.

Excess oil from this source causes an unnecessary oil consumption for the engine since more oil can flow in this manner than is necessary for the mere lubrication of the valve stem in the valve guide. Improperly operating piston rings are usually blamed for any condition where there is an excess oil consumption in an engine, and in many instances the piston rings have been blamed for excessive oil consumption where excess oil flow really resulted from the condition mentioned above.

To cure this condition, I have provided a seal placed around the valve stem at the side of the valve guide remote from the head of the valve and thus restrict the flow of oil along the stem of the valve. The seal is constructed so that sufficient oil can pass by to properly lubricate the valve guide but not in such quantities as will cause the difficulties referred to above. While the upper end of the valve guide has some scraping action on the stem of the valve to remove some of the oil, the seal above the valve guide proper moves excess oil creeping along the stem and permits it to be drained off rather than to be forced through the guide.

As mentioned above, the seal may be formed separately from the valve guide or may be formed integral therewith when the guide is of the type that is press-fitted into the cylinder head. The valve stem seals shown herein are of the type which is formed separately from the valve guide and may be used with a cylinder head construction which has an integral portion for guiding the valve stem or with a cylinder head where the valve stem guide is press-fitted into the head. The embodiments of the invention shown herein all comprise a seal portion and means for securing or anchoring the seal in place about the valve stem and holding it against reciprocation with the stem. The seal comprises a resilient metal collar which is longitudinally split to render it expansible and has its internal bore tapered to hug the valve stem at the smaller end of the seal.

In Fig. 1 of the drawings, I have illustrated a portion of the valve-operating mechanism of an engine with a valve stem seal and attaching means embodying the features of the invention. Thus, in this view, the cylinder head is indicated at 10, and mounted in the head 10 is a valve comprising a valve stem 11 and a valve head 12 positioned to open and close the passage 13 communicating with the combustion chamber 14 of the engine. The valve stem 11 projects upwardly through the head and extends above the head and is urged upwardly by a spring 15 to cause the valve to close the passage. To open the passage, the valve is adapted to be depressed by a rocker arm 16 pivotally mounted on a bracket 17 on the head 10, and the rocker arm in this instance is shown as being actuated by a push rod 18 adapted to be operated by the cam shaft of the engine in the usual manner.

The valve stem seal shown in the drawings is adapted to be mounted about the valve stem adjacent the guide portion of the cylinder head so as to scrape off excess oil from the valve stem before the oil can be drawn into the guide. The attaching means for the seal is adapted to be secured to the cylinder head. In most engines where the guide is integral with the cylinder head the cylinder head casting has a generally cylindrical upstanding portion 20 to provide a guide of sufficient length to give adequate support for the valve stem. In the various embodiments of the invention shown herein, the attaching means for the valve seal is in the form of an inverted cup-like structure adapted to extend over and embrace the upstanding guide portion 20.

In the embodiment shown in Figs. 1, 2 and 3, the seal comprises a metal collar 21 which is longitudinally split as at 22 and is tapered, at least internally, so as to hug the valve stem at the smaller end of the collar. In the present instance, the collar 21 is shown as being tapered internally at 23 and externally at 24, and the taper 24 is of greater degree than the taper 23 so that the upper or smaller end of the collar is of slightly less thickness than the lower or bottom end. The thickness of the metal and the degree of taper is such that the collar will resiliently hug the stem 11 of the valve and scrape oil therefrom when the stem reciprocates.

Since the seal 21 is adapted to be mounted around the valve stem 11 adjacent the guide portion 20 of the cylinder head, the means for holding the seal in place is of inverted cup-like form to fit over and embrace the guide portion 20. In the present instance, the attaching means comprises a sheet metal cup 25 adapted to fit over the guide portion 20 and having an end wall 26. To secure the seal 21 to the member 25, the end wall 26 is centrally apertured as at 27, and the larger end of the seal 21 is provided with an external annular groove 30 to receive the margin of the aperture 27. Since the seal 21 is longitudinally split and is resilient, it may be compressed sufficiently to permit it to pass through the aperture 27 and then expand when the end wall 26 is aligned with the groove 30. The margin of the aperture 27 thus fits within the groove 30 to firmly hold the seal in place adjacent the guide portion 20.

The cup-like attaching member 25 is adapted to be secured to the cylinder head in fixed relation thereto. For this purpose, the cup-like member 25 at its open end is provided with an outwardly turned flange 31 adapted to seat against the cylinder head. In this instance, the valve spring 15 is utilized to hold the cup-like member 25 in place and is therefore seated against the flange 31 to hold the flange against the cylinder head.

The seal 21, since it is held in a fixed position, scrapes oil from the valve stem as the latter reciprocates. However, sufficient oil without excess passes through the seal to lubricate the stem within the guide portion 20. The upper end of the guide portion may also effect some scraping action on the valve stem to remove oil. To prevent any accumulation of oil scraped from the stem by the guide portion 20, the cup-like member 25 is provided with drain openings to permit the oil to escape. Thus, in the present instance, the flange 31 is shown as being bent to provide a plurality of radially extending ribs 32 which form grooves permitting any oil accumulating within the cup-like member to escape.

The cup-like member 25 is preferably made slightly larger in internal diameter than the outside diameter of the guide portion 20 to provide substantial clearance therebetween, as illustrated in Fig. 2. Thus, if the outside surface of the guide portion 20 is eccentric to the valve stem, the member 25 can hold the seal concentric with the stem.

In the modified construction shown in Figs. 4 and 5, I provide a valve stem seal comprising a tapered metal collar 33 which is similar to the seal 21 shown in Fig. 2. The collar 30 is longitudinally split as at 34 to give it the desired resilience. The attaching means in this instance clamps the seal 33 against the end of the guide portion 20 of the cylinder head. To this end, the seal 33 is provided with an outwardly extending flange 35 at its larger end, and the split 34 in the seal may extend into the flange 35 so that the seal has adequate resilience. An inverted cup-like member 36 is provided to clamp the flange 35 against the end of the guide portion 20. Thus, the member 36 is provided with an end wall 37 which engages the flange 35, and the side walls of the member 36 are thickened to receive one or more setscrews 40 which are adapted to engage the guide 20. In the present instance, two such setscrews 40 are shown. The length of the inverted cup member 36 is such that there is space, as indicated at 41, under its lower edge to permit drainage of oil, should any oil accumulate therein. Since the seal is a separate piece from the member 36, the seal can be positioned concentric with the stem and the member 36 can be positioned concentric with the outside surface of the guide 20, if the stem is eccentric to such outside surface.

With this construction, the seal 33 is held in fixed relation and resiliently hugs the valve stem 11 so as to scrape excess oil therefrom. If the seal 33 is held down tight against the upper end of the guide 20, it also gives added support to the valve stem since the seal 33 constitutes in effect an extension of the guide portion 20.

In the modified construction shown in Figs. 6, 7 and 8, I provide a tapered resilient seal 42 which is longitudinally split as at 43. The means for securing the seal 42 in place adjacent the end of the guide 20 comprises in the present instance a continuous unsplit flange 44 formed integral with the seal 42. The flange 44 has a collet portion in the form of a split sleeve 45 embracing the guide portion 20. In the present instance, the sleeve 45 is shown as being split at four points 46. The exterior of the sleeve 45 is provided with tapering threads 47 which are adapted to be engaged by a nut 50. Thus, by tightening the nut 50 on the threads 47, the sleeve 45 will be compressed inwardly to firmly engage a reduced end on the guide 20. With this construction, a resilient tapered longitudinally split seal 40 is provided, which is held in a fixed position and embraces the valve stem 11 to scrape excess oil therefrom. This construction also permits the seal to give added support to the stem, since the seal is held in a fixed position.

In the modified construction shown in Figs. 9, 10 and 11, I provide a resilient tapered seal 51 provided with a longitudinal slit 52. To hold the seal 51 in place, in the present instance it is formed integral with an inverted cup member comprising an end wall 53 from which the seal 51 extends, and a side wall 54. The side wall 54 extends downwardly in a radially spaced relation to the reduced extension on the guide 20. Adjacent its lower end, the wall 54 is provided with means adapted to secure it to the reduced extension, which in this instance comprises a washer-like element 55. The element 55 is of upwardly coned shape and at its exterior fits into an annular groove 56 formed in the wall 54. To permit the washer element 55 to be placed in the groove 56, the washer is split as at 57 so that it may be compressed sufficiently to let it snap into the groove 56. To render the washer 55 resilient, it is provided with a plurality of notches 60 extending outwardly from its inner periphery and the inner edge of the washer is adapted to engage the reduced end of the guide 20.

Because of its coned form, the washer 55 grips the reduced end of the guide 20 and tends to prevent removal of the cup-like portion of the seal 51. Downward movement of the valve stem 11 will tend to carry the seal downwardly until it abuts the guide portion 20, and the washer 55 freely permits such movement. However, during upward movement of the valve stem, the inner edge of the washer 55 engages the reduced end of the guide 20 and tends to grip it more firmly to prevent removal. Thus, the seal 51 is held in a fixed position and because it resiliently hugs the valve stem, it will scrape excess oil therefrom.

I claim:

1. A valve stem seal comprising a resilient, longitudinally split, tapered collar adapted to hug the valve stem at the smaller end of the collar, and means for securing said collar in place, said means being attached to said collar adjacent its larger end with the smaller end projecting axially beyond said means.

2. A valve stem seal comprising a resilient, longitudinally split collar both interiorly and exteriorly tapered and adapted to hug the valve stem at the smaller end of the collar, and an anchoring member attached to the larger end of said collar with the smaller end projecting axially beyond said member.

3. A valve stem seal for a spring actuated valve, comprising a resilient, longitudinally split, tapered collar adapted at its smaller end to hug the valve stem, and a sheet metal inverted cup member having its closed end secured to the larger end of said collar with the smaller end of the collar projecting beyond said cup member, said cup member having an outwardly turned flange at its open end, said flange being adapted to be engaged by the valve spring to hold the cup member in place.

4. A valve stem seal for a spring actuated valve, comprising a resilient, longitudinally split, tapered collar adapted at its smaller end to hug the valve stem, and a sheet metal inverted cup member having its closed end provided with a central aperture, said collar having an annular groove in its larger end with the margin of said aperture received within said groove, said cup member at its open end having an outwardly turned flange adapted to be engaged by the valve spring to hold it in place.

5. A valve stem seal for a spring actuated valve, comprising a resilient, longitudinally split, tapered collar adapted at its smaller end to hug the valve stem, and a sheet metal inverted cup member having its closed end provided with a central aperture, said collar having an annular groove in its larger end with the margin of said aperture received within said groove, said cup member at its open end having an outwardly turned flange adapted to be engaged by the valve spring to hold it in place, said flange being bent to provide radial grooves for draining oil from the interior of the cup member.

6. A seal for a valve stem mounted in a guide portion of a cylinder head, comprising a resilient, longitudinally split, tapered collar adapted at its smaller end to hug the valve stem, said collar having an outwardly extending flange at its larger end, an inverted cup-like centrally apertured member engaging said flange and adapted to clamp said flange against the guide portion of the cylinder head, and securing means on said member for securing said cup-like member to the guide portion.

7. A seal for a valve stem mounted in a guide portion of a cylinder head, comprising a resilient, longitudinally split, tapered collar adapted at its smaller end to hug the valve stem, said collar having an outwardly extending flange at its larger end with the split extending into the flange, an inverted cup-like centrally apertured member adapted to clamp said flange against the end of the guide portion of the cylinder head and to extend downwardly over the guide portion, and one or more setscrews threaded in said member for securing it to the guide portion.

8. A seal for a valve stem mounted in a guide portion of a cylinder head, comprising a resilient, longitudinally split, tapered collar adapted at its smaller end to hug the valve stem, said collar having a flange at its larger end and a collet extending from said flange, and a nut threaded on said collet for clamping said collet about the guide portion of the cylinder head.

9. A seal for a valve stem mounted in a guide portion of a cylinder head, comprising a resilient, longitudinally split, tapered collar adapted at its smaller end to hug the valve stem, said collar having a continuous flange extending outwardly from its larger end and a longitudinally split sleeve extending from the flange and adapted to embrace the guide portion of the cylinder head, said sleeve being externally tapered and threaded, and a nut threaded on said sleeve for clamping the sleeve to the guide portion.

10. A seal for a valve stem mounted in a guide portion of a cylinder head, comprising a resilient, longitudinally split, tapered collar adapted at its smaller end to hug the valve stem, inverted cup-like means extending from the larger end of said collar and adapted to embrace the guide portion of the cylinder head, and resilient means within said cup-like means for securing the latter to the guide portion.

11. A seal for a valve stem mounted in a guide portion of a cylinder head, comprising a resilient, longitudinally split, tapered collar adapted at its smaller end to hug the valve stem, said collar having an integral inverted cup extending from the larger end of the collar and adapted to embrace the guide portion of the cylinder head, said cup having an internal annular groove, and a split cone-shape resilient washer fitting in said groove for resiliently engaging the guide portion.

References Cited in the file of this patent
UNITED STATES PATENTS

| | | |
|---|---|---|
| 950,268 | Weston et al. | Feb. 22, 1910 |
| 1,344,347 | Lee | June 22, 1920 |
| 1,370,346 | Nelson | Mar. 1, 1921 |
| 1,481,562 | Rowe | Jan. 22, 1924 |
| 1,834,616 | Hanson | Dec. 1, 1931 |
| 2,418,674 | Steiner | Apr. 8, 1947 |